May 6, 1958  C. K. BENSON ET AL  2,833,203
FOOD PROCESSING MACHINE
Filed Oct. 19, 1953  4 Sheets-Sheet 1
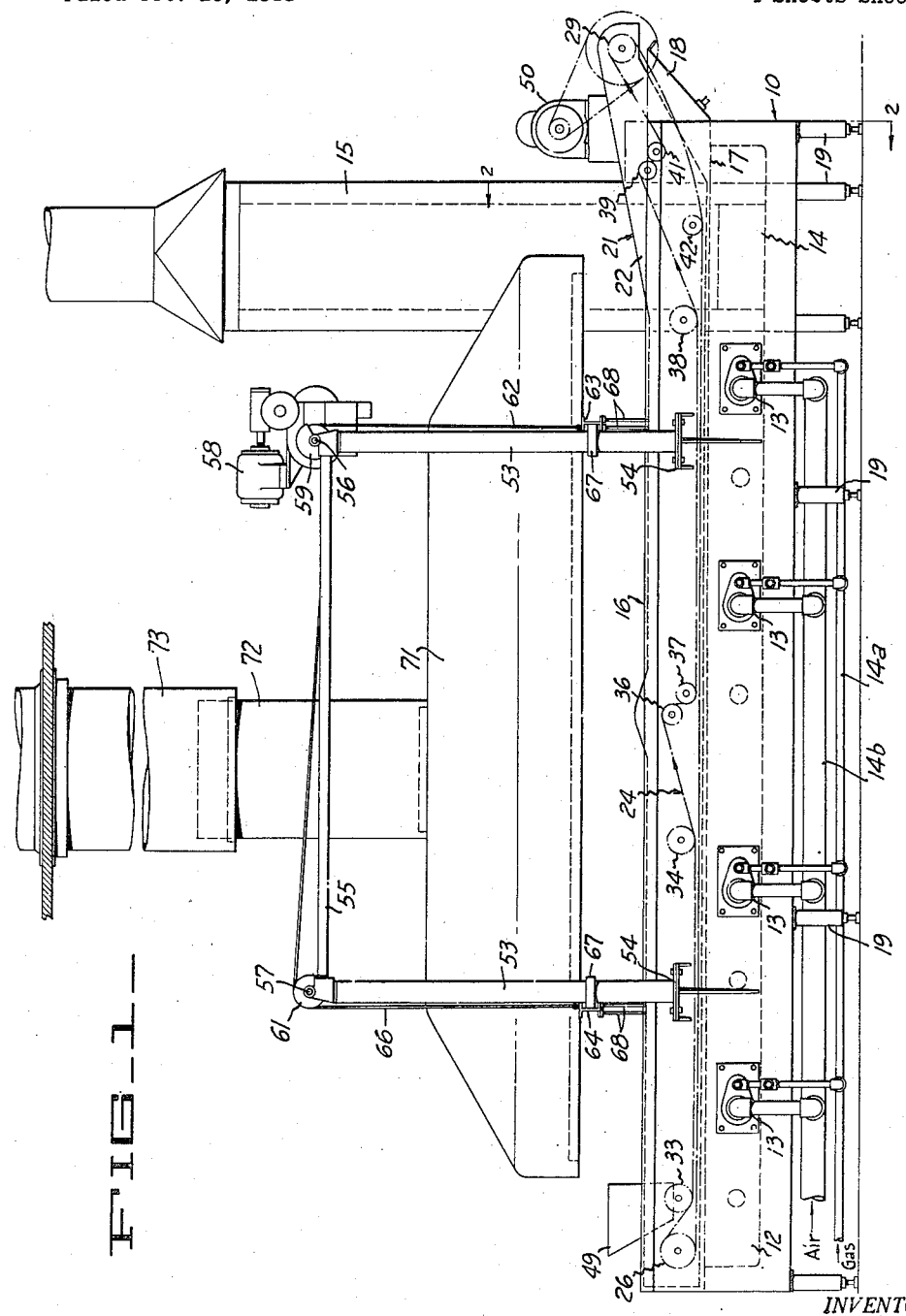
INVENTORS
CLARK K. BENSON
JAMES C. HARRIS, JR
A. A. CARIDIS
BY
*Flehr & Swain*
ATTORNEYS

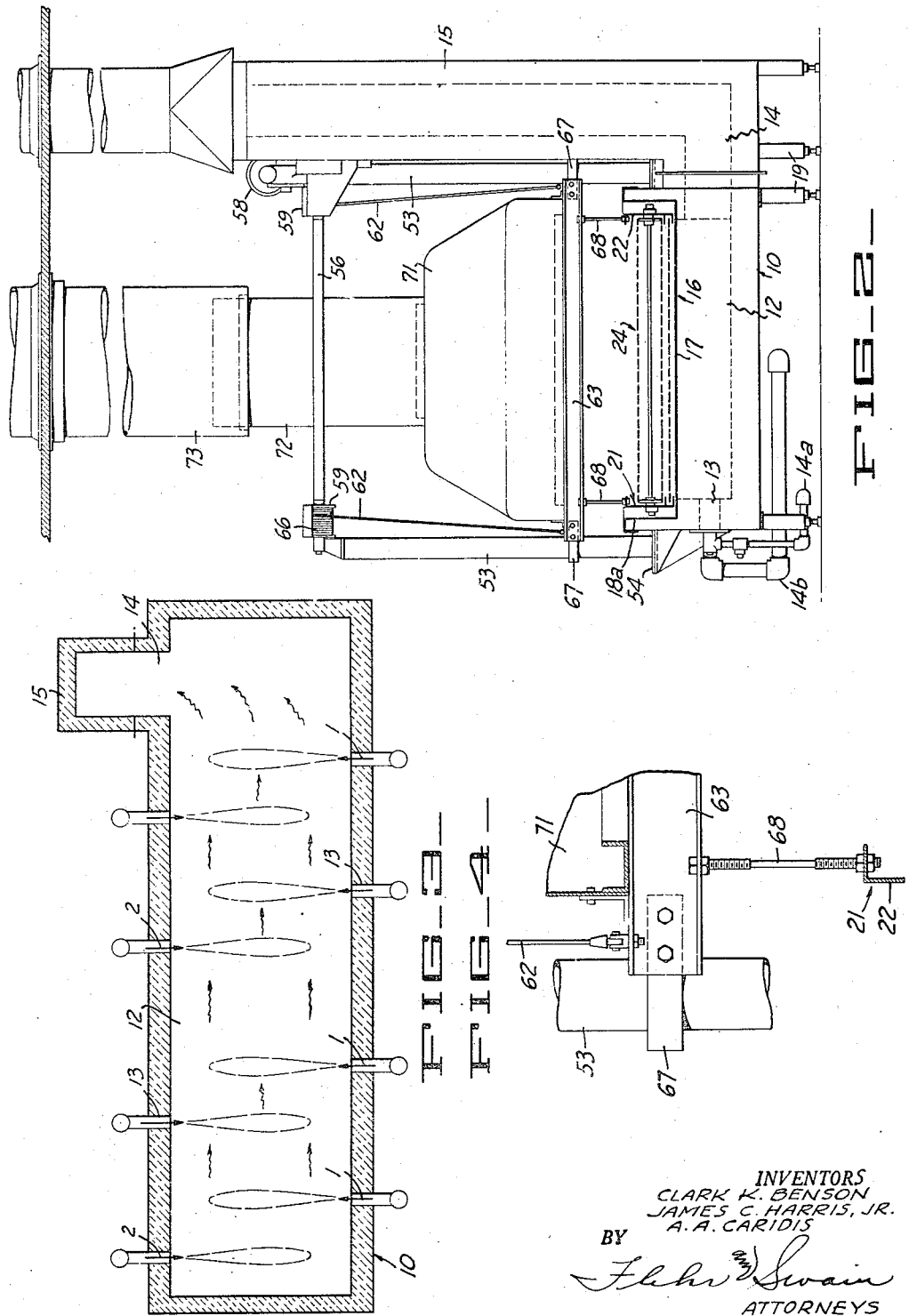

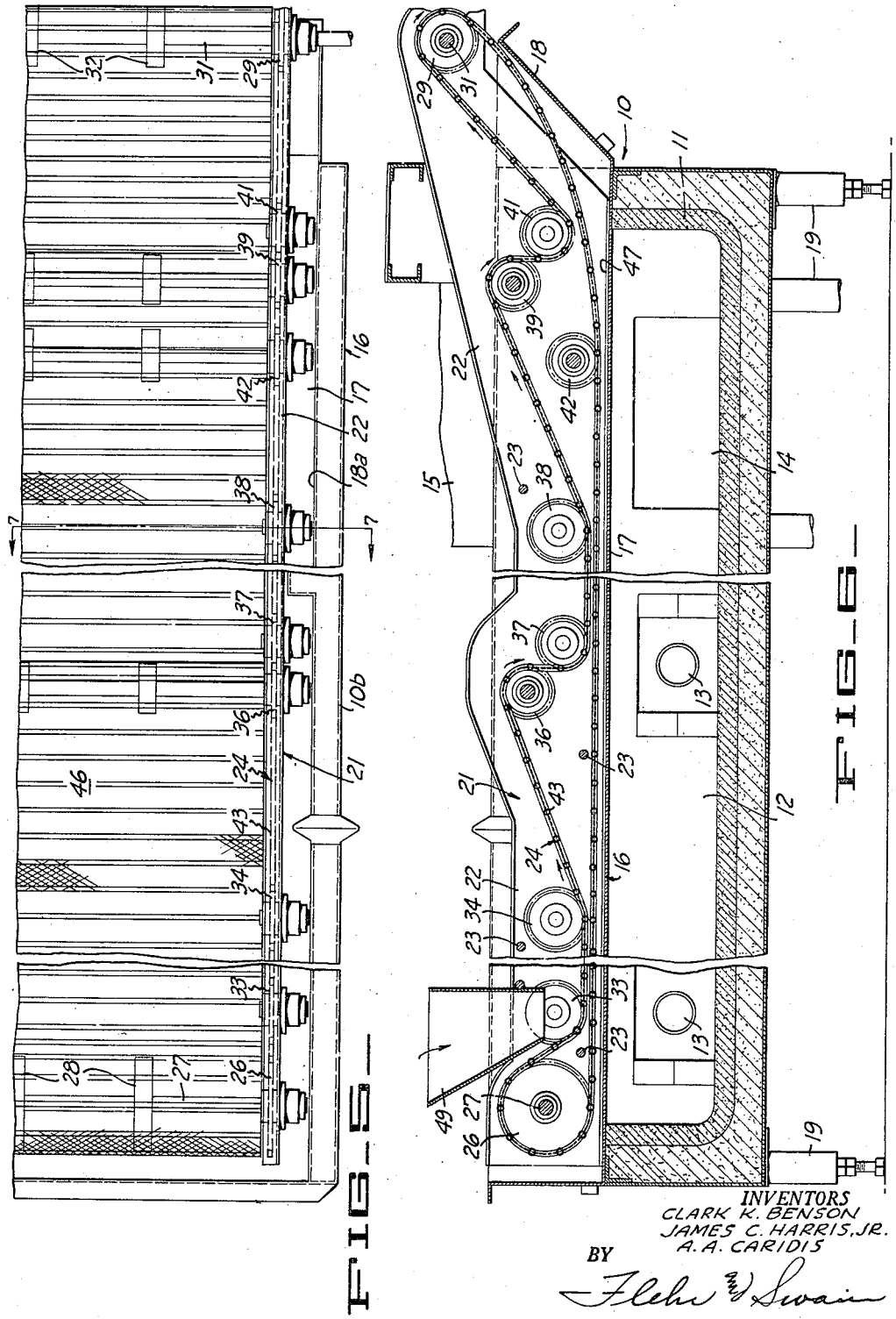

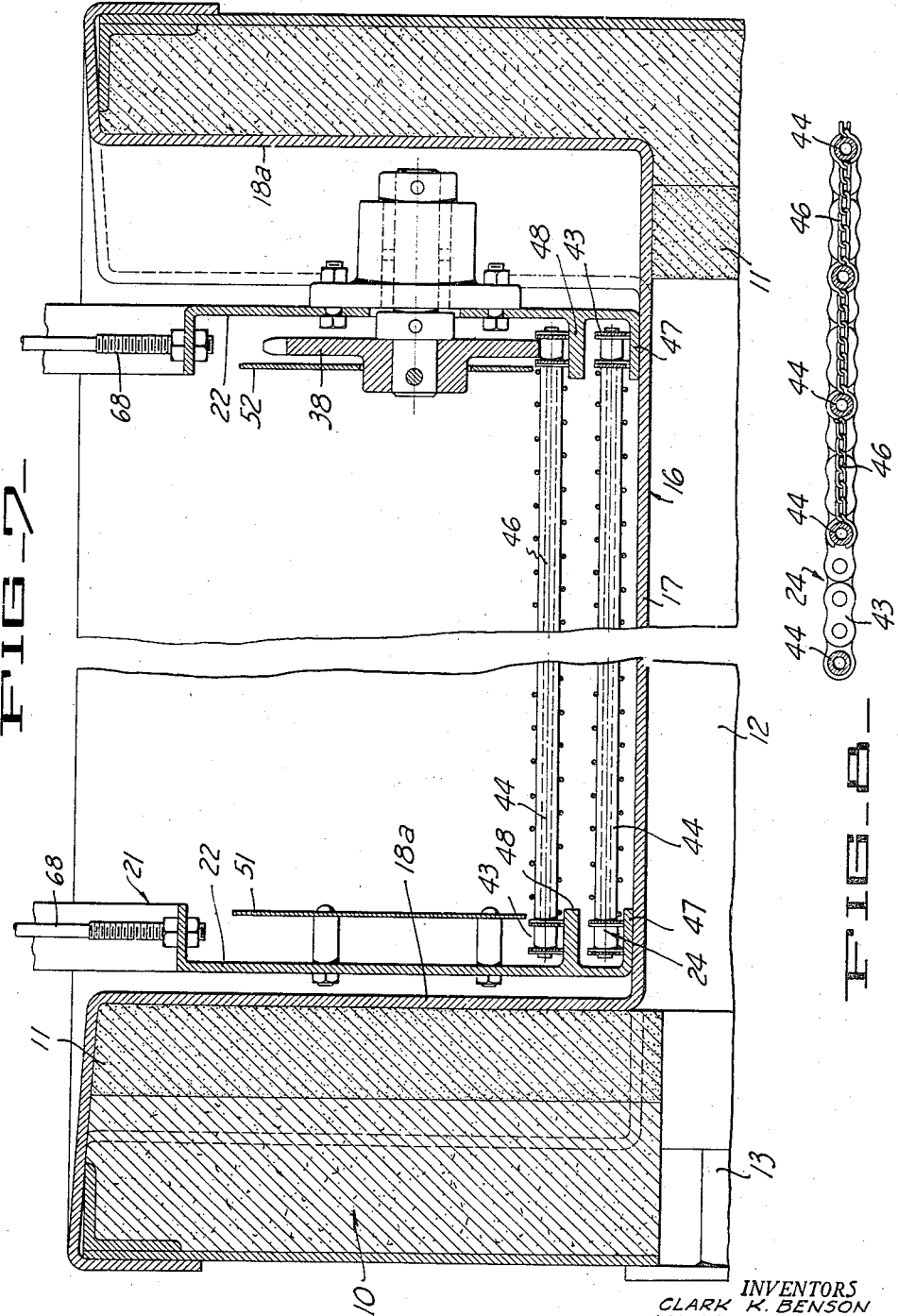

United States Patent Office 2,833,203
Patented May 6, 1958

2,833,203

FOOD PROCESSING MACHINE

Clark K. Benson, Millbrae, James C. Harris, Jr., Berkeley, and Andrew A. Caridis, Daly City, Calif., assignors to Heat and Control, Inc., San Francisco, Calif., a corporation of California Application October 19, 1953, Serial No. 386,986

2 Claims. (Cl. 99—404)

This invention relates generally to food processing machines suitable for carrying out deep fat cooking or frying operations.

In the food processing industry there has been a demand for a machine capable of carrying out continuous deep fat cooking or frying operations, preliminary to further processing, such as packaging and deep freezing. An acceptable machine for this purpose should be capable of automatic continuous operation with a minimum amount of attention, and should permit the desired degree of cooking under close automatic control. Also it should be constructed to facilitate cleaning and other service operations.

In general it is an object of the present invention to provide a practical machine of the above character, and particularly one which is adapted for high capacity, continuous operation, and which can be advantageously applied to such operations as the cooking of French fried potatoes, preparatory to packaging and deep freezing.

Another object of the invention is to provide a machine of the above character having good control characteristics, and which in particular can automatically compensate for a varying rate of feed to the machine, whereby the degree of cooking and the surface color characteristics of the products leaving the machine can be kept substantially constant and at an optimum value.

Another object of the invention is to provide a machine of the above character which can be readily cleaned and serviced.

Another object of the invention is to provide a machine characterized by relatively even distribution of heat to the oil or fat bath.

Additional objects and features will appear from the following description in which the preferred embodiment of the invention has been set forth in detail in conjunction with the accompanying drawing.

Referring to the drawing:

Figure 1 is a side elevational view illustrating a machine in accordance with the present invention.

Figure 2 is an end view of the machine illustrated in Figure 1.

Figure 3 is a schematic diagram showing distribution of the burners.

Figure 4 is a detail on an enlarged scale illustrating the attachment between the elevating and conveyor means.

Figure 5 is a partial plan view of the food handling and conveying unit, with the overlying hood removed.

Figure 6 is a side elevational view in section, showing the principal parts of the machine, but with the hood and associated parts removed.

Figure 7 is a cross sectional detail on an enlarged scale taken along the line 7—7 of Figure 5.

Figure 8 is a detail illustrating one type of conveyor which can be used.

Referring to Figures 1 and 2 of the drawing the machine consists generally of a housing 10, which serves to house a gas-fired heating means, and a tray or shallow vat for containing the cooking oil. A food handling and conveying unit is adapted to be lowered or raised with respect to the tank, and serves when in lowered position to progress the product through the hot cooking oil, and to turn or tumble the product one or more times intermediate the complete cooking period.

Referring particularly to Figure 6, the lower portion of the housing 10 is provided with a refractory lining 11, to form a heating chamber 12. Assuming that natural gas or like fuel is to be used, burners 13 are distributed along the side walls of the chamber, 12, and connected to the exterior gas supply piping 14a. Combustion supporting air is shown being supplied through piping 14b.

Preferably the burners are of a type adapted to produce what is known as a tempered flame, or in other words a flame in which the temperature is regulated by means of varying the relative amount of excess air introduced by way of the burner port or ports. To accomplish this the flow of combustion supporting air is kept at a maximum constant rate, and the flow rate of the gas or fuel flow is varied with the heat requirements. Such an arrangement promotes maximum circulation of hot gases in the heating chamber 12, thus making for maximum uniformity in the heat. At high input rates the burner flame is relatively long and luminous, while at minimum input rate it is short and clear, due to the excess air, and the resultant heating temperature is relatively low. The burners are disposed whereby the flames are projected in a general horizontal direction, and laterally of the chamber 12. One end of the chamber 12, and preferably that end near the discharge end of the machine, is connected by passage 14 to the flue or chimney 15.

The upper portion of the housing forms the oil vat 16. This vat has a bottom horizontal wall 17, which directly overlies the chamber 12. The one end wall 18, corresponding to the discharge end of the machine, can be inclined. The side walls 18a can be heat insulated as illustrated.

The housing is provided with a plurality of adjustable legs 19 resting upon a table or suitable support, so that the housing can be adjusted for proper horizontal position.

The food handling and conveying means is in the form of a complete assembly unit 21. This unit is made independent of the vat 16, so that it can be raised or lowered as desired.

The construction of unit 21 illustrated particularly in Figures 6 and 7 is as follows: A pair of side vertical plates 22 are connected by the horizontal rods 23, to form a frame. The frame serves to support a series of sprockets which are engaged by the endless roller chain conveyor 24. The sprockets 26, which are carried by the journal shaft 27, engage one end loop of the conveyor. Intermediate the sprockets 26 the conveyor is engaged by the rollers or wheels 28. The other discharge end of the conveyor is engaged by the sprockets 29, which are carried by the shaft 31. Intermediate the sprockets 29 the shaft 31 is similarly provided with wheels or rollers 32. At various positions between the ends of the conveyor, it is engaged by additional idler sprockets. Thus idler sprockets 33 and 34 engage the upper run of the conveyor near the feed end of the machine. After the upper run of the conveyor leaves the sprockets 34, it is inclined upwardly, and then passes over and under the idler sprockets 36 and 37. The change in direction of movement thus imparted to the upper run of the conveyor serves to temporarily elevate products from the hot oil, and to roll or tumble them. This serves to redistribute the pieces uniformly upon the conveyor, and to separate any pieces which may have adhered together, thus eliminating undesired uneven cooking or striping. After leaving the sprockets 37, the conveyor engages the lower sides of the sprockets 38 and from thence is inclined upwardly to engage over and under the sprockets 39 and 41. The sprockets likewise change the direction of movement of the conveyor to cause objects to be turned or tumbled. This again separates the product and helps remove excess oil, with the oil draining back into the kettle rather than being carried off with the product. From the lower side of the sprockets 41 the conveyor then continues upwardly to the sprockets 29. The lower run of the conveyor is shown being engaged by the sprockets 42.

The conveyor itself can be of conventional construction. The type illustrated in Figures 7 and 8 consists of side link chains 43, which are connected by the rods 44. The rods 44 are interconnected by a plurality of short sections of link chain belting 46.

The lower run of the conveyor is adapted to rest upon the flange 47, which is provided upon the lower edges of the side plates 22. The side plates also carry a flange or rib 48 which overlies the lower run of the conveyor, and which extends for substantially the entire length of the oil vat.

At the left end of the machine as viewed in Figure 6, means is provided to facilitate feeding objects such as pieces of potato, to the conveyor. This means can be in the form of a feed hopper 49, which is shown disposed above the upper run of the conveyor 24 adjacent the sprockets 26. It is suitably secured to the side plates 22.

Suitable guard plates 51 and 52 are also shown carried by the side plates 22. These guards are mounted in spaced relationship to the corresponding plates 22, and they can be apertured to accommodate the hubs of the various sprockets, as illustrated.

Suitable means, such as the electric motor 50, is provided for driving the conveyor at a desired speed.

The elevating means for the entire unit 21 can consist of vertical pipes 53, which are carried by brackets 54. The upper ends of the pipes 53 are connected by brace rods 55, and serve to support the rotatable shafts 56 and 57. Shaft 56 is driven by means of the reversible electrical motor 58, and carries the cable reels 59. The other shaft 57 is provided with the cable sheaves 61. Cables 62 are wrapped upon the reels 59, and have their lower ends attached to the extremities of the cross member 63. Another cross member 64 is similarly attached to cables 66, which extend upwardly over the sheaves 61, and rearwardly for attachment to the reels 59. The ends of the cross members 63 and 64 are provided with members 67 for slidably engaging the vertical pipes 53. The side plates 22 of the unit 21 are attached to the cross members 63 by the rods or bolts 68. Thus when the motor 58 is operated to turn the shaft 56 in one direction or the other, the cables 62 and 66 are wound up or played out to raise or lower the entire conveyor unit.

A hood 71 generally overlies the unit 21, and serves to collect smoke and odors. It can rest directly upon the cross members 63 and 64 as illustrated in Figures 1 and 2, and it is connected to the vent or flue pipe 72, which slidably and telescopically engages the pipe 73. Pipe 73 can connect with suitable draft means, such as the intake of a fan, or a chimney.

Figure 3 illustrates a distribution pattern which can be used for locating the various burners in the chamber 12. The arrows 1 represent burners on one side of the chamber 10, and the arrows 2 are corresponding burners on the opposite side. Note that these burners are staggered along the length of the combustion chamber. As schematically illustrated the flames from the burners during normal operation are relatively long, and extend laterally across the chamber. Air introduced at each burner, which is not required for combustion of the fuel gas, may be referred to as excess air, and is heated and intimately mixed with the burning fuel gas leaving the burner ports. Therefore in addition to the cross-sweep of the burner flames, there is a general flow of products of combustion and hot gases lengthwise of the chamber and toward the discharge end, with all of such gases being finally delivered through the opening 14. At high input rates the flame is luminous with resulting high flame radiating characteristics, which produces a high heat transfer condition and a minimum of thermal lag. At low firing rates there is no visible flame, and the high rate of excess air, besides tempering or cooling the burner flame, also tends to cool the surfaces defining the chamber 12 to reduce its heat radiation. The lining of the combustion chamber is preferably of low heat storage and high insulating value refractory which provides a minimum of thermal lag on a rising temperature gradient, and a minimum temperature over-ride on low heat demand. This method of heating makes for uniform and rapid transfer of heat to the bottom 17 of the vat 16, and to the oil within the bath, thus avoiding localized overheating and making for a relatively uniform temperature throughout the oil. The arrangement also facilitates automatic control of heat input. There is a minimum of thermal lag, and the temperature of the oil quickly responds to an adjustment in the rate of fuel gas applied to one or more of the burners.

It is desirable to employ suitable thermostatic control of the burners. Preferably this is accomplished by the use of one or more thermocouples (not shown) which are in direct conductive contact with the bottom wall 17 of the vat, and connected to controllers which in turn operate the valves for regulating the rate of fuel supplied. Since the volume of the oil in the vat is relatively small the thermal response of the thermocouples is thereby directly related to the oil bath temperature and product flow. In some instances we also provide additional recording thermometer type controllers in each zone of the vat to record the oil temperature. Such controllers can be connected by methods known to those familiar with such equipment, to act as a high limit over-ride shut-off for the burners, in order to provide utmost safety.

Operation of the machine described above can be summarized as follows: Assuming that uniformly cut pieces of raw potato are being supplied to the machine, for a cooking operation preparatory to packaging and cold freezing, the potatoes are supplied to the hopper 49 while the conveyor is in operation, and after the oil in the vat has attained an optimum temperature. As the pieces of potato are submerged within the hot oil, they are carried along by the upper run of the conveyor from the hopper 49, to the region of the sprockets 34 (Figure 1). They are then slowly elevated by the inclined conveyor portion extending between the sprockets 34 and 36, and are tumbled over back into the oil, to be progressed by that portion of the conveyor extending between the sprockets 37 and 38. The potatoes are then slowly elevated out of the hot oil, and as they reach the region of the sprockets 39, they are again tumbled and thereafter further elevated for discharge over the sprockets 29.

When it is desired to clean the machine the tank is drained and motor 58 operated to elevate the entire unit 21 clear of the tank. The elevated unit and the interior of the tank can now be thoroughly cleaned by the use of steam, detergents, etc.

We claim:

1. A food processing machine of the character described comprising a vat adapted to hold a quantity of oil, means for progressing objects to be cooked from one end of the vat to the other end thereof, said means comprising an endless conveyor, means for causing portions of the upper run of the conveyor to be looped, certain of the looped portions being intermediate the ends of the vat for elevating the product from the oil and then tumbling the product back into the oil to effect redistribution of the product upon the conveyor to eliminate striping and uneven cooking, a hood spaced from and overlying said vat, means for moving the hood and the endless conveyor vertically as a unit with respect to the vat, a flue, and means for maintaining communication between the hood and the flue during vertical movement of the hood and the conveying means.

2. A food processing machine of the character described comprising a vat adapted to hold a quantity of oil, means for heating the oil, means for progressing objects to be cooked from one end of the vat to the other end thereof, a hood spaced from and overlying the vat, means for moving the hood and the means for progressing the objects vertically as a unit with respect to the vat, a flue, and means for maintaining communication between the hood and the flue during vertical movement of the hood, said means for progressing the objects to be cooked consisting of an endless conveyor and sprocket wheels engaged by the conveyor, said sprocket wheels being disposed to cause portions of the upper run of the conveyor to be looped, certain of the looped portions being intermediate the ends of the vat for elevating the product from the oil and then tumbling the product back into the oil to effect redistribution of the product upon the conveyor to eliminate striping and uneven cooking, the other of said looped portions being disposed adjacent the discharge end of the machine and at an elevation above the level of the oil.

References Cited in the file of this patent

UNITED STATES PATENTS

| | | |
|---|---|---|
| 1,429,904 | Judson | Sept. 19, 1922 |
| 1,674,555 | Leone et al. | June 19, 1928 |
| 1,821,689 | Broeg | Sept. 1, 1931 |
| 1,919,185 | Chapman | July 25, 1933 |
| 2,042,655 | Ferry | June 2, 1936 |
| 2,141,362 | Platt et al. | Dec. 27, 1938 |
| 2,546,163 | McBeth | Mar. 27, 1951 |

FOREIGN PATENTS

| | | |
|---|---|---|
| 434,808 | Germany | Oct. 4, 1926 |